United States Patent
Wei

(10) Patent No.: US 11,194,118 B2
(45) Date of Patent: Dec. 7, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solution Pte. Ltd., Singapore (SG)

(*) Notice: Subject to any disclaimer, the term of this patent is extended or adjusted under 35 U.S.C. 154(b) by 224 days.

(21) Appl. No.: 16/529,774

(22) Filed: Aug. 1, 2019

(65) Prior Publication Data

US 2020/0049932 A1    Feb. 13, 2020

(30) Foreign Application Priority Data

Aug. 10, 2018 (CN) .......................... 201821296352.6

(51) Int. Cl.
*G02B 7/02* (2021.01)

(52) U.S. Cl.
CPC ............. *G02B 7/025* (2013.01); *G02B 7/021* (2013.01); *G02B 7/022* (2013.01); *G02B 7/026* (2013.01)

(58) Field of Classification Search
CPC . G02B 7/02; G02B 7/00; G02B 7/004; G02B 7/025; G02B 7/021; G02B 7/022; G02B 7/026; G02B 7/023; G02B 7/028; G02B 7/08; G02B 13/00; G02B 13/0015; G02B 27/00; G02B 27/0018; H04N 5/225; H04N 5/2254

USPC ....... 359/830, 819, 809, 811, 818, 813, 611, 359/703, 704, 706

See application file for complete search history.

(56) References Cited

U.S. PATENT DOCUMENTS 8,675,127 B2 * 3/2014 Nakajima ............ H04N 5/2253
348/374

FOREIGN PATENT DOCUMENTS

JP            2005092141    *    4/2005 ............... G02B 7/02

OTHER PUBLICATIONS

English translation of JP 2005092141, machine translated on Mar. 24, 2021. (Year: 2005).*

* cited by examiner

*Primary Examiner* — Jie Lei
(74) *Attorney, Agent, or Firm* — W&G Law Group

(57) ABSTRACT

The present disclosure relates to the field of optical lenses and discloses a lens module. The lens module includes a lens barrel, a first lens disposed on an object side of the lens barrel, and a fixing member pressing the first lens on the lens barrel from an object side of the first lens. The fixing member includes a top wall pressing the first lens, and a side wall extending from an outer edge of the top wall towards an image side and fixedly connected to an outer edge of the lens barrel. The top wall and the side wall define a receiving space. The receiving space receives a part of the first lens. The fixing member is provided with notches penetrating the top wall and communicating with the receiving space. The notches are filled with glue. The glue adheres and fixes the lens barrel to the fixing member.

8 Claims, 4 Drawing Sheets

LENS MODULE

TECHNICAL FIELD

The present disclosure relates to the field of optical lenses and more particularly to a lens module for a vehicle-mounted system.

BACKGROUND

In recent years, with the continuous development of technology, lens modules are constantly developed towards miniaturization. Except that the electronic devices (such as digital cameras, tablet computers and mobile phones) are equipped with the lens modules, public transportation vehicles are also equipped with the lens modules, which are called as vehicle-mounted lenses. The vehicle-mounted lens generally has a structure such as a lens barrel and a lens.

The inventors of the present disclosure have found that at least the following problem exists in the related art: during use, the vehicle-mounted lens is subjected to the external force such as vibration, friction, and collision, thereby causing poor reliability of the vehicle-mounted lens. Therefore, how to improve the reliability of the vehicle-mounted lens has become an urgent problem to be solved.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present invention will be further illustrated with reference to the accompanying drawings and the embodiments.

Figure 1:
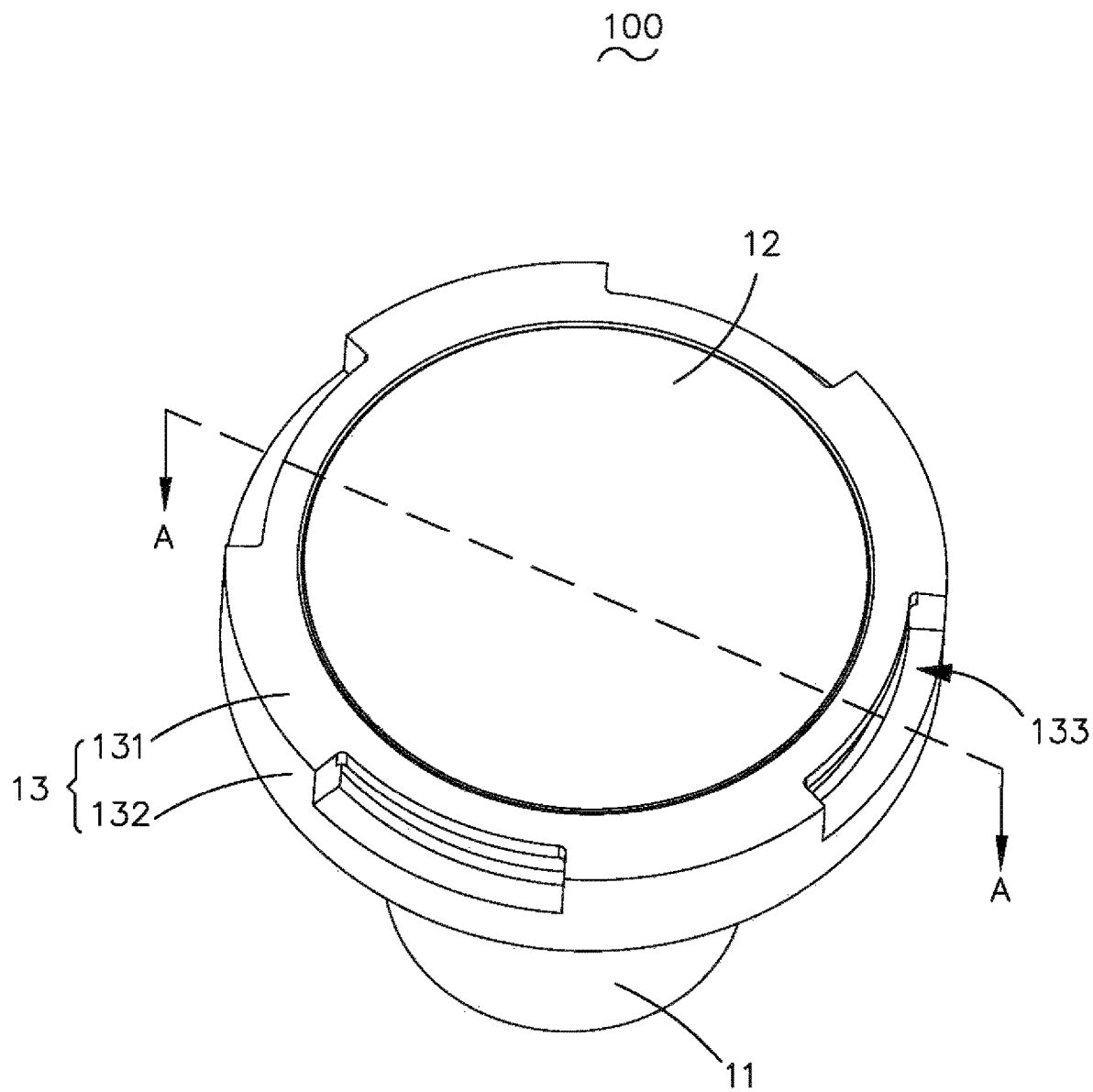
FIG. 1 is a perspective schematic structural view of a lens module according to a first embodiment of the present disclosure.
Figure 2:
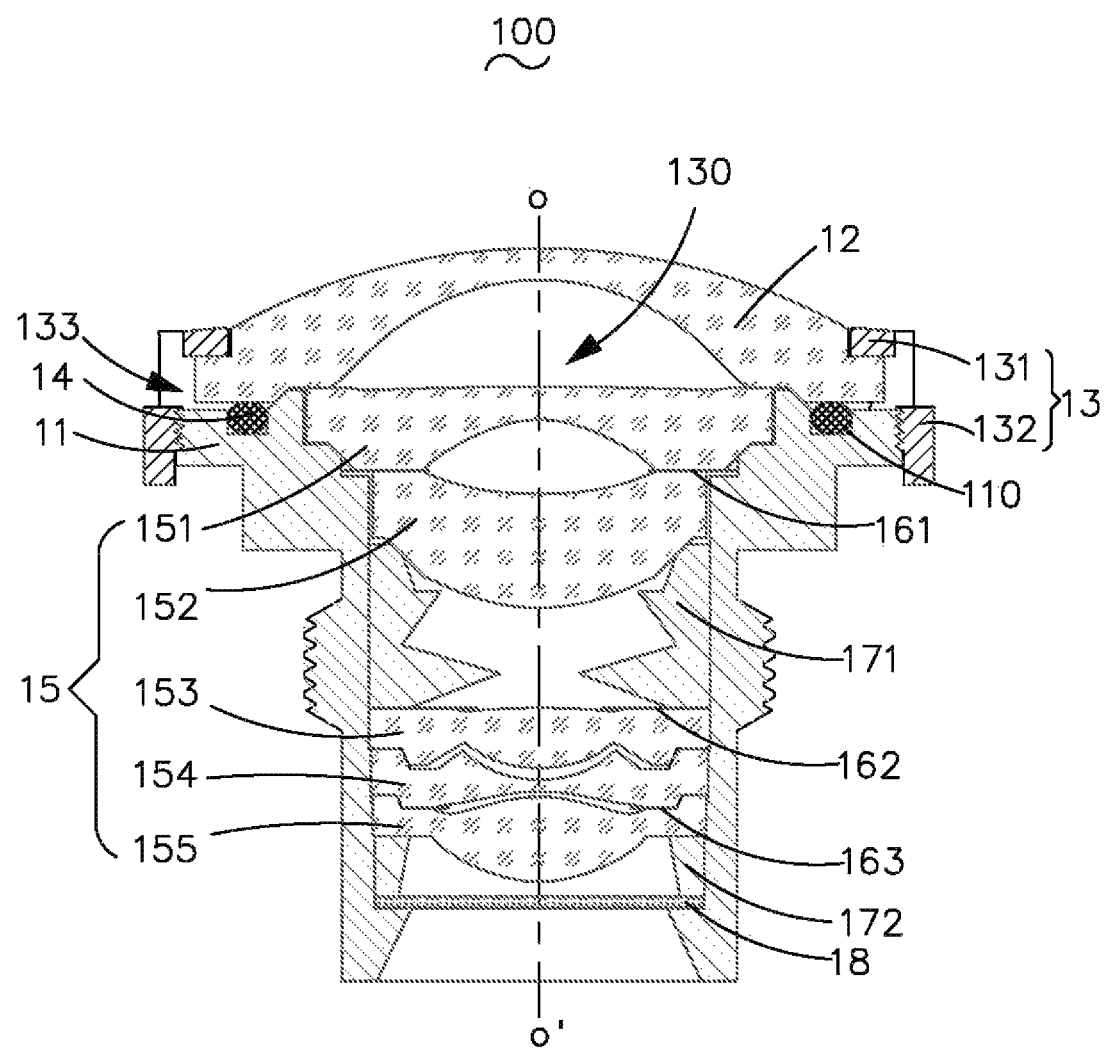
FIG. 2 is a cross-sectional schematic structural view of FIG. 1 along line A-A.

The first embodiment of the present disclosure relates to a lens module 100. As shown in FIGS. 1-2, the lens module 100 includes a lens barrel 11, a first lens 12, and a fixing member 13. The first lens 12 is disposed on the object side of the lens barrel 11. The fixing member 13 presses the first lens 12 on the lens barrel 11 from the object side of the first lens 12. The fixing member 13 includes a top wall 131 and a side wall 132. The side wall 132 extends from the outer edge of the top wall 131 to the image side. The top wall 131 presses the first lens 12, the side wall 132 is fixedly connected to the lens barrel 11, and the top wall 131 and the side wall 132 define a receiving space 130. The receiving space 130 receives one end of the lens barrel 11 close to the object side. The fixing member 13 is provided with notches 133. The notches 133 penetrate the top wall 131 and communicate with the receiving space 130. The notch 133 is filled with glue. The glue adheres and fixes the first lens 12 and the lens barrel 11 to the fixing member 13.

According to the embodiment of the present disclosure, compared with the related art, the fixing member 13 presses the first lens 12 on the lens barrel 11 from the object side of the first lens 12 by the top wall 131, so that the first lens 12 and the lens barrel 11 can be fixed. Meanwhile, the top wall 131 and the side wall 132 of the fixing member 13 define the receiving space 130, and the receiving space 130 receives one end of the lens barrel 11 close to the object side. The notch 133 formed in the fixing member 13 penetrates the top wall 131 and communicates with the receiving space 130. The glue filled into the receiving space 130 by the notches 133 can extend to a part where the first lens 12 and the fixing member 13 are connected and a part where the lens barrel 11 and the fixing member 13 are connected, so as to adhere the first lens 12, the fixing member 13 and the lens barrel 11 together. Therefore, the first lens 12 and the fixing member 13, and the lens barrel 11 and the fixing member 13 are more firmly fixed, thereby improving the reliability of the whole lens module 100. In addition, when the lens module is being assembled, a jig can be inserted into the notches formed in the fixing member for facilitating rotation and assembly.

It is worth mentioning that the notches 133 are connected to the outer edge of the top wall 131, and the notches 133 penetrate the side wall 132. That is, the notches 133 are open, and the notches 133 are formed from the outer edge of the top wall 131 towards the inner edge. Since the outer edge is cut open, the filling of the glue can be facilitated, and the side wall 132 is prevented from hindering the filling of the glue, thereby improving the operation efficiency of glue filling.

It should be noted that the number of the notches 133 is at least two. In this way, the receiving space 130 can be filled with the glue from the at least two notches 133 to increase the adhering area between the first lens 12 and the fixing member 13 and between the lens barrel 11 and the fixing member 13. The adhesive force between the first lens 12 and the fixing member 13 and between the lens barrel 11 and the fixing member 13 is increased. Therefore, the first lens 12 and the fixing member 13 and the lens barrel 11 and the fixing member 13 are more firmly fixed.

As an example, the notches 133 are equidistantly distributed around the optical axis OO' of the first lens 11. In this way, the adhesive force between the first lens 12 and the fixing member 13 and between the lens barrel 11 and the fixing member 13 is uniformly distributed to further improve the stability of the lens module 100.

In the present embodiment, the fixing member 13 is a thread cap, the side wall 132 and the lens barrel 11 are provided with threads, and the side wall 132 and the lens barrel 11 are matched and fixed by the threads. It can be understood that, in an optional embodiment of the present disclosure, the side wall 132 and the lens barrel 11 may also be matched in other manners. For example, a boss may be disposed on the lens barrel 11, the side wall 132 is provided with a groove, and the boss is embedded into the groove. No matter what manner, as long as the side wall 132 is fixed to the lens barrel 11, the manner is within the scope of the present disclosure.

Further, a sealing ring 14 is disposed between the lens barrel 11 and the first lens 12. The sealing ring 14 can prevent the foreign matter (such as water and dust) from the outside of the lens barrel from entering the receiving space 130 through the notches 133, which would otherwise enter the lens barrel 11, thereby avoiding the influence on the performances of the optical elements received in the lens barrel 11.

In the present embodiment, the lens barrel 11 is provided with a groove 110, and the sealing ring 14 is received in the groove 110. Compared with the case where the sealing ring is disposed on the flat surface without the groove, the groove 110 can receive part of the outside foreign matter, and can better block the outside foreign matter and better prevent the foreign matter from entering the lens barrel 11, which would otherwise influence the performances of other optical elements received in the lens barrel 11.

It should be noted that the groove 110 is annular around the optical axis OO' of the first lens 12. The groove 110 is annular, and can be conveniently matched with the sealing ring 14 to prevent the outside foreign matter from entering the lens barrel 11 from all directions.

In addition, in the present embodiment, the lens module 100 further includes a second lens 15 disposed in the lens barrel 11 and located on the image side of the first lens 12. The second lens 15 includes a lens 151, a lens 152, a lens 153, a lens 154, and a lens 155. A first light shading sheet 161 is disposed between the lens 151 and the lens 152. A first gasket 171 and a second light shading sheet 162 are disposed between the lens 152 and the lens 153. The first gasket 171 is located on the object side of the second light shading sheet 162. A third light shading sheet 163 is disposed between the lens 154 and the lens 155. A second gasket 172 and a light filter 18 are provided on the image side of the lens 155, and the second gasket 172 is located on the object side of the light filter 18.

Figure 3:
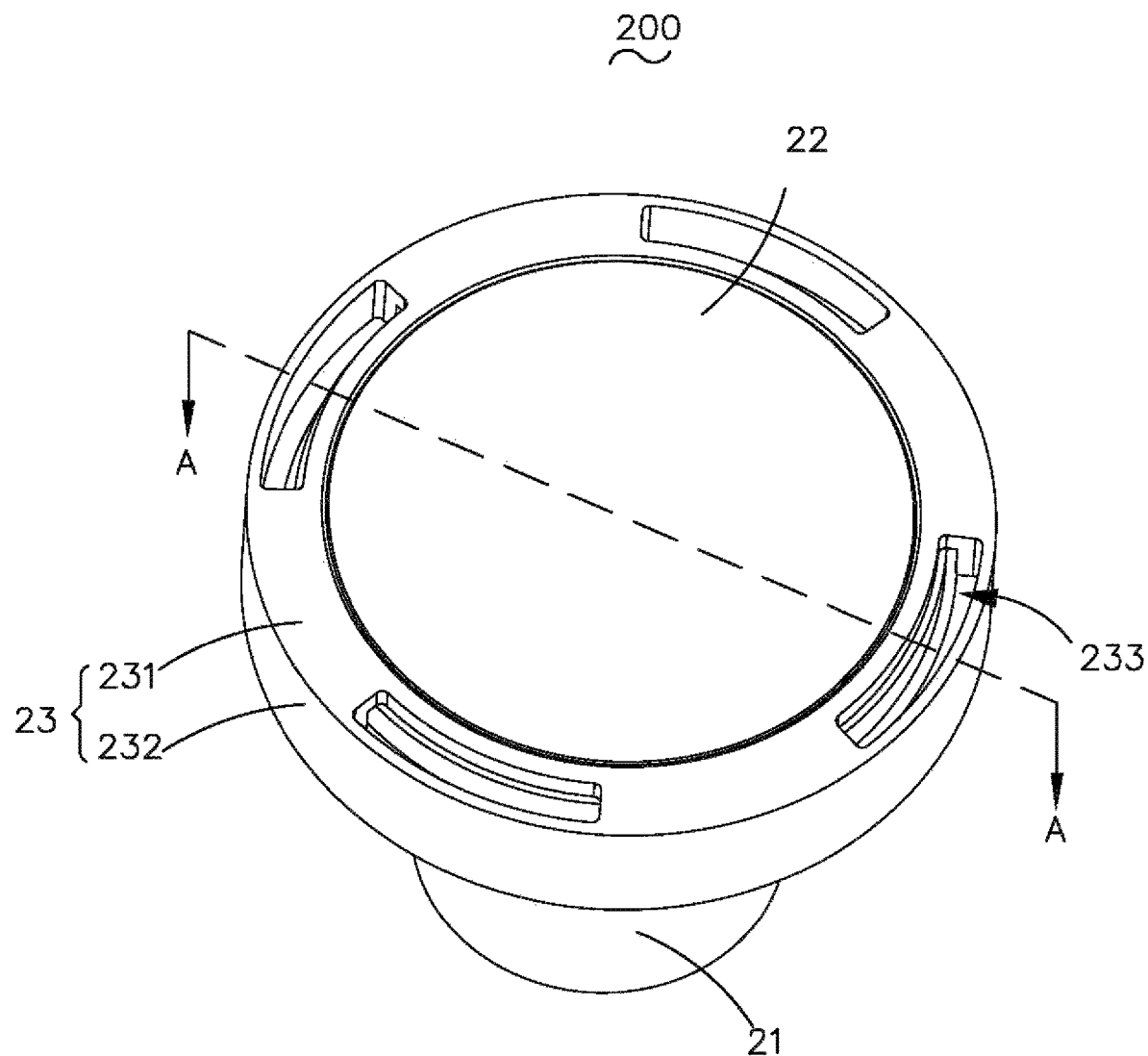
FIG. 3 is a perspective schematic structural view of a lens module according to a second embodiment of the present disclosure.
Figure 4:
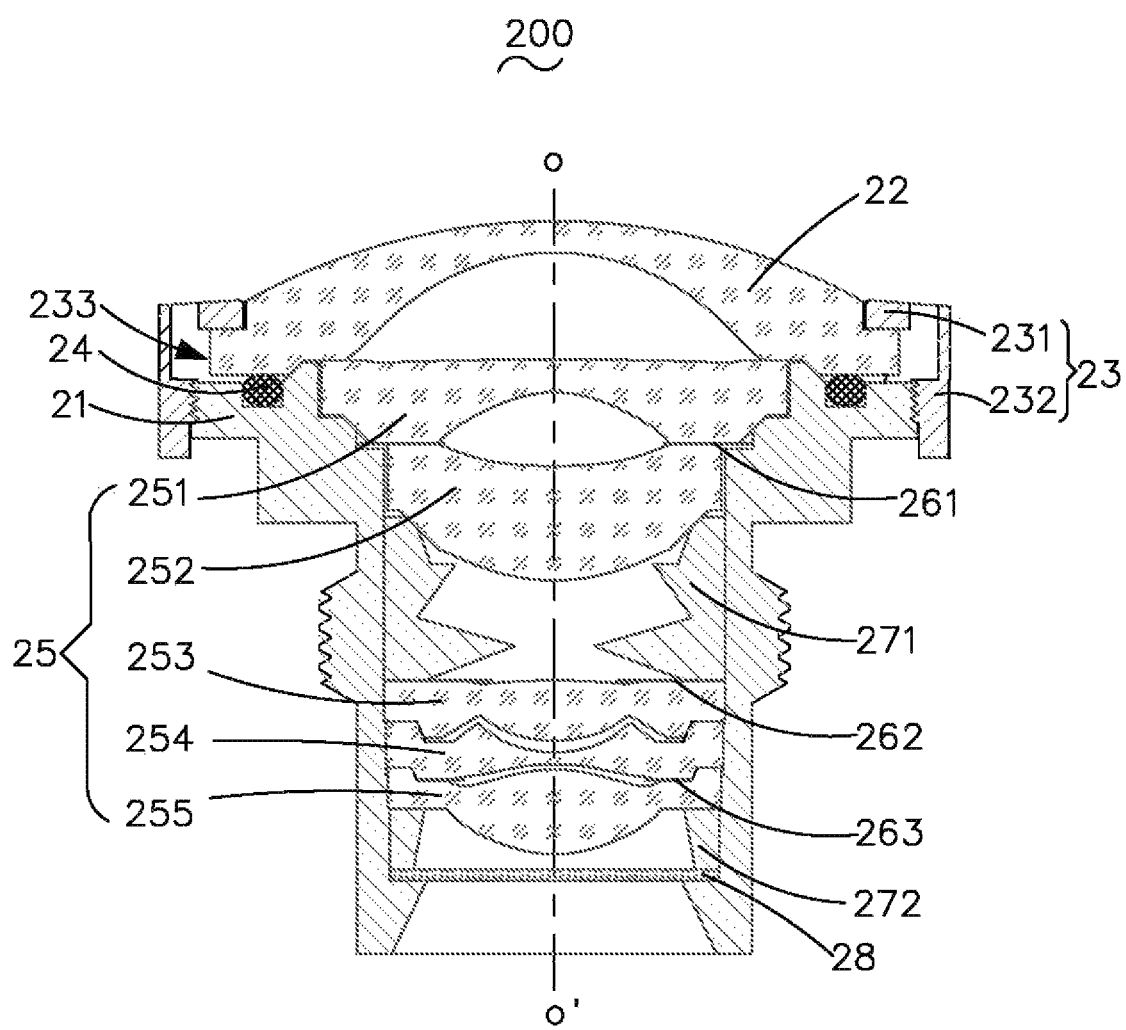
FIG. 4 is a cross-sectional schematic structural view of FIG. 3 along line A-A.

The second embodiment of the present disclosure relates to a lens module 200, as shown in FIGS. 3-4, including: a lens barrel 21, a fixing member 23, a first lens 22, a gasket 24, and a second lens 25. The second lens 25 includes a lens 251, a lens 252, a lens 253, a lens 254, and a lens 255. A first light shading sheet 261 is disposed between the lens 251 and the lens 252, and a first gasket 271 and a second light shading sheet 262 are disposed between the lens 252 and the lens 253. The first gasket 271 is located on the object side of the second light shading sheet 262, a third light shading sheet 263 is disposed between the lens 254 and the lens 255, and a second gasket 272 and a light filter 28 are disposed on the image side of the lens 255. The second gasket 272 is located on the object side of the light filter 28. The second embodiment is substantially the same as the first embodiment, and the main difference is that in the first embodiment, the notches 133 are connected to the outer edge of the top wall 131, and the notches 133 penetrate the side wall 132. In the second embodiment of the present disclosure, the notches 233 are spaced apart from the outer edge of the top wall 231.

In the present embodiment, the notches 233 are spaced apart from the outer edge of the top wall 231, and the side wall 232 is not penetrated by the notches 233, that is, the notches 233 are not opened, and the outer edge of the top wall 231 is not cut open. The notches are located between the outer edge and the inner edge of the top wall 231, so that compared with the case where the outer edge of the top wall 231 is cut open, not only the adverse effect of the notches 233 on the structural strength of the fixing member 23 can be reduced, but also the outer edge of the top wall 231 can be configured to block the glue when the glue is being filled, thereby preventing the glue from flowing out from the outer edge of the top wall 231, and reducing the waste of the glue.

Those of ordinary skill in the art can understand that the above embodiments are specific embodiments for implementing the present disclosure. In actual application, various changes can be made in form and detail without departing from the spirit and scope of the present disclosure.

What is claimed is:

1. A lens module, comprising:
    a lens barrel;
    a first lens disposed on an object side of the lens barrel; and
    a fixing member pressing the first lens on the lens barrel from an object side of the first lens,
    wherein the fixing member comprises a top wall pressing the first lens, and a side wall extending from an outer edge of the top wall towards an image side and fixedly connected to an outer edge of the lens barrel, the top wall and the side wall define a receiving space, the receiving space receives a part of the first lens, the fixing member is provided with notches penetrating the top wall and communicating with the receiving space, the notches are spaced apart from the outer edge of the top wall, the notches are filled with glue, and the glue adheres and fixes the first lens and the lens barrel to the fixing member.

2. The lens module as described in claim 1, wherein a number of the notches is at least two.

3. The lens module as described in claim 2, wherein the notches are equidistantly distributed around an optical axis of the first lens.

4. The lens module as described in claim 1, wherein the fixing member is a thread cap, an inner edge of the side wall and the outer edge of the lens barrel are provided with threads, and the side wall and the lens barrel are matched and fixed by the threads.

5. The lens module as described in claim 1, wherein a sealing ring is disposed between the lens barrel and the first lens.

6. The lens module as described in claim 5, wherein the lens barrel is provided with a groove, and the sealing ring is received in the groove.

7. The lens module as described in claim 6, wherein the groove is annular around an optical axis of the first lens.

8. The lens module as described in claim 1, further comprising at least one second lens disposed in the lens barrel and located on an image side of the first lens.

* * * * *